Nov. 3, 1936.   C. J. HOLSLAG   2,059,236

METHOD OF MACHINING BY ELECTRIC CURRENT

Filed Aug. 13, 1932

INVENTOR
CLAUDE J. HOLSLAG
BY
A. D. T. Libby
ATTORNEY

Patented Nov. 3, 1936

2,059,236

UNITED STATES PATENT OFFICE

2,059,236

METHOD OF MACHINING BY ELECTRIC CURRENT

Claude J. Holslag, South Orange, N. J., assignor to Electric Arc Cutting & Welding Company, Newark, N. J.

Application August 13, 1932, Serial No. 628,760

1 Claim. (Cl. 219—1)

This invention relates to a method of machining metals by use of electric current.

In my Patents 1,321,309, issued November 11, 1919, and 1,451,392, issued April 10, 1923, I have shown electrodes and described the method of operation thereof for perforating and cutting metal.

In my present application, I show a new method of machining as distinguished from cutting, the object of which is to present a system of machining which is much faster than any other method of which I am aware and one in which the work or piece being machined is left in very nearly a finished condition, ready for use, that is, the part where the machining is performed, is left even and/or smooth.

My present improvement is especially advantageous in the manufacture of shafts or shafting as will be later pointed out.

The system of machining herein described will be readily understood by reference to the annexed drawing wherein.

Figure 1:
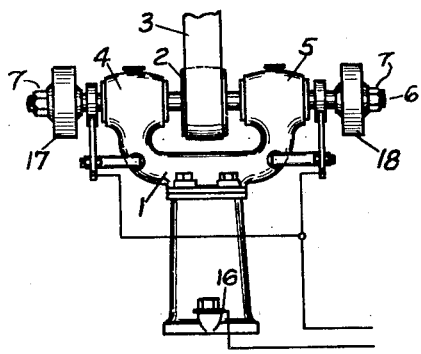
Figure 1 is a side view of a form of apparatus equipped with two tools for machining purposes.
Figure 3:
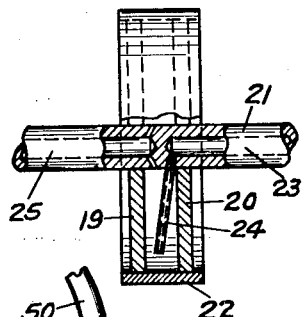
Figure 3 is a plan view of another form of tool which may be used in the operation shown in Figures 1 and 2.
Figure 4:
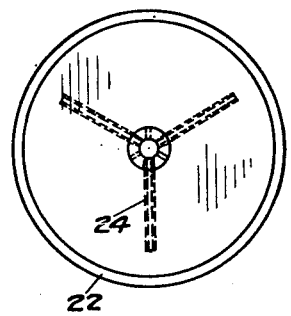
Figure 4 is an end view of Figure 3.

In the various forms of apparatus used to illustrate my invention, Figure 1 shows a machine 1 such as may be used for polishing purposes in which a pulley 2 driven by a belt 3, runs between bearing supports 4 and 5. On the opposite threaded ends of the shaft 6 is fastened by any satisfactory means as by nuts 7, rotary tools 17 and 18. These tools for machining purposes only, may be of any desirable composition and I have found that mild steel gives excellent results although I have used other metals in place of steel. I may in some cases even use carbon and/or carborundum rotary tools made with a suitable binder, it being understood that the composition of the rotary tools is such that it or they will be current conducting. The rotary tools 17 and 18 for machining purposes are materially wider on their machining face than if the apparatus were going to be used for merely cutting of metals, in which case they would be in the form of relatively thin discs. The machining tools 17 and 18 may be constructed, if desired as shown in Figure 3 wherein two metal discs 19 and 20, preferably of steel are mounted on the shaft 21. Around the outer periphery of the discs 19 and 20 is fastened as by welding an annular ring 22 which serves as the machining surface between the tool and the work-piece, and if desired, the interior of the tool may be cooled by a fluid inlet passage 23 which may be supplied with one or more jet-tubes 24 to throw the cooling fluid directly against the inner part of the peripheral shoe 22. An outlet passage 25 acts to carry the cooling fluid away from the tool.

Figure 2:
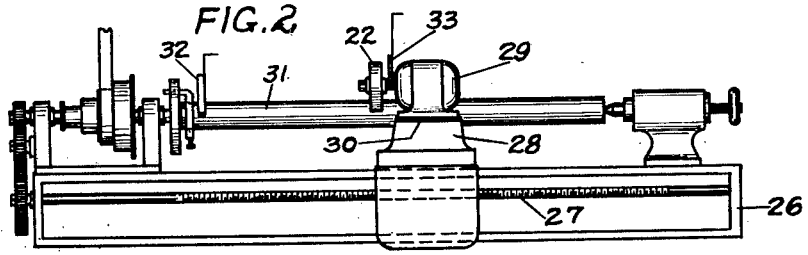
Figure 2 is a partial view of part of a lathe showing the application of my machining scheme to machining down a shaft.

Another specific application of this type of tool is illustrated in Figure 2 wherein a lathe 26 carries on its feed-screw 27 a holder 28 carrying an electric motor 29, the motor being insulated from the holder 28 by the insulator 30. Current may be conveyed to the shaft 31, that is to be machined down in any suitable manner as by brush-contact 32 connected to a suitable source of current. Likewise the tool 22 may be connected to the same source by brush-contact 33.

My invention is especially adapted for machining-down shafts where the same are relatively long for the reason that I have found there is little or no pressure existing between the rotating tool 32 and the shaft 31 so that the shaft will not be sprung in its lathe supports which is quite apt to be the case during the usual machine operations, especially where any attempt is made to hurry the operation by taking a deep cut with the usual cutting tool.

In any of the forms illustrated if any great amount of pressure is set up between the tool and the work-piece an arc will not be established and therefore its effect will not be obtained. Hence it naturally follows that the pressure between the tool and the work-piece is very low and even zero and in the case of machining-down the shaft as illustrated in Figure 2, no detrimental pressure is applied between the tool and the shaft.

Figure 5:
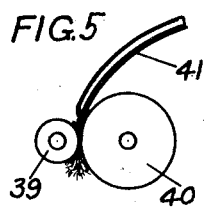
Figure 5 shows diagrammatically a further modification of my invention.
Figure 6:
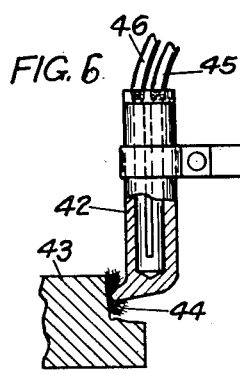
Figure 6 shows the application of the idea of my invention to a nibbling machine or high speed shaper and Figure 7 shows an application of the idea to a die-sinking tool.

In Figure 5 I have illustrated diagrammatically a work-piece 39 to be operated upon by a tool in the shape of a wheel 40. The action of the tool may be augmented by the introduction of oxygen or other suitable gas through the nozzle 41. In Figure 6 a specially designed tool 42 is adapted for use in a nibbling machine or high-speed shaper where the motion is up and down or reciprocatory, the work-piece 43 being operated on by the action of the arc along the line 44. This type of tool may be cooled by bringing in a cooling fluid through the pipe 45 and taking it out through the pipe 46, both of which are flexible.

Figure 7:
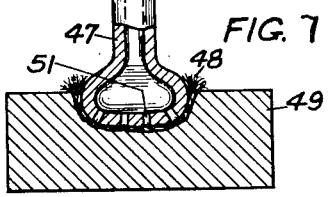

In the application of the idea illustrated in Figure 7, a special tool 47 has an expanded end 48 for die-sinking purposes by which a hole is machined into the work-piece 49. In this case, a stream of gas or air is forced by the pipe 50 into the interior of the tool and through the orifices 51 in the end thereof to blow the molten metal out of the hole being made by the tool, and to keep the tool cool.

In many of the operations performed by this method of machining, the process is such as to produce a finished result. However, in certain operations, for example in turning down a shaft as indicated in Figure 2, a finishing cut by the ordinary lathe tool may be required, in which case the operations by my method may be considered as the roughing cut, the time taken by this being materially reduced, with the additional advantage that the shaft is never sprung, as has been explained.

In the forms shown in Figures 5, 6 and 7 the electrical connections to the work and tool are not illustrated as their application will be obvious, but it is to be kept in mind that the voltage, current and reactance in the current-supply are adjusted to the proper values to produce the desired result in accordance with the operation to be performed. The source of current supply may be either alternating or direct, but I prefer to use a transformer such as described in my Patent No. 1,305,362 issued June 3, 1919 in which the terminals of the secondary are connected to the apparatus as shown in Figures 1 and 2. Whatever the source of current is, the normal voltage should be sufficient to hold a continuous arc between the tool and the work when the two are brought into initial touching engagement, the tool being then in motion. If the speed or rotation or movement of the tool is sufficiently high very rapid machining will result, due to the multitudinous number of rapidly shifting small arcs which are established and maintained between the moving tool and the work and the metal is rapidly machined away in a smooth even manner at a speed depending on the speed or rotation or movement of the tool and the value of the current flowing in the circuit. In many cases I have found it desirable to adjust the source of current so that the voltage is about one-half that required to hold a stationary arc between the tool and the piece being operated upon. This reduction of voltage will take less power and will meet the demands for ordinary purposes, assuming of course that the tool is moved at the proper speed. Besides, with the lower voltage, a smoother operation can be made and wear on the tool will be much less and more even.

While I have shown the application of my machining method to a relatively stationary machine, a machining tool may be applied to a portable type of apparatus.

Having thus described my invention, what I claim is:

The method of machining a work-piece of considerable length with respect to its diameter by a tool with very little or no pressure between the piece and tool during the machining operation thereby effecting a poor contact, which consists in causing relatively rapid movement between the work-piece and tool in one plane at an angle to the axis of the work-piece, while at the same time causing relatively slow movement between the tool and work-piece in a direction parallel to the axis of the work-piece, applying a source of current between the tool and work-piece, the voltage of the current being approximately one-half that required to hold a steady arc between the tool and work-piece to be machined while in such poor contact.

CLAUDE J. HOLSLAG.